Patented Sept. 5, 1950

2,521,586

UNITED STATES PATENT OFFICE 2,521,586

PRODUCTION OF THE 17-MONOBENZOATE ESTER OF ANDROSTENE DIOL

Joseph Levy, Union, and Roland Kapp, Newark, N. J., assignors to Nopco Chemical Company, Harrison, N. J., a corporation of New Jersey No Drawing. Application June 1, 1949, Serial No. 96,626

14 Claims. (Cl. 260—397.5)

The present invention relates to derivatives of $\Delta^{5,6}$-androstene-3,17-diol and more particularly to an improved process for producing the 17-monobenzoate ester of $\Delta^{5,6}$-androstene-3,17- diol.

Derivatives of the androstene series have been found to be quite useful as intermediates in the production of sex hormones and similar compounds. One of the compounds which has been found to be quite useful for such purposes is the 17-monobenzoate ester of $\Delta^{5,6}$-androstene-3,17-diol. One of the earliest methods for the production of this ester is disclosed by Ruzicka et al. in Helv. Chim. Acta. 18, 1478 (1935). They reported that this compound could be formed by the partial saponification of a mixed diester of the diol, preferably the 3-acetate-17-benzoate. The specific procedure given in the article discloses that the authors considered that the most satisfactory procedure for partially saponifying the 3-acetate-17-benzoate ester of $\Delta^{5,6}$-androstene diol was by carrying out the partial saponification in methyl alcohol by admixing 1 gram of the diester with approximately 200 mls. of methyl alcohol containing sufficient alkali to accomplish the saponification. This mixture was allowed to stand at room temperature for 50 hours in order to accomplish the partial saponification. By carrying out the partial saponification in accordance with this procedure, it is possible to obtain relatively high yields of substantially pure monobenzoate esters. The procedure disclosed in the article from Helv. Chim. Acta. is the same as that set forth in U. S. Patent No. 2,387,469 of Ruzicka et al. The patentees employ the same high ratios of solvent to diester in carrying out their partial saponification of the diesters as was employed in the procedure set forth in the article from Helv. Chim. Acta. In the article it is stated that the rate of saponification is six times faster when carried out in ethyl alcohol than in methyl alcohol, and in the patent a procedure for partial saponification of the diesters using ethyl alcohol as the saponification solvent is disclosed, e. g. see Example V of the patent. The patentees employed a temperature of 30° C. and a ratio of ethyl alcohol to diester of 200 to 1 in carrying out this reaction. This is essentially the same ratio of solvent they used when employing methyl alcohol as the solvent. Although the time of reaction in Example V of the patent is only 4 hours as compared to the 50 hours required in Example IV of the patent where methyl alcohol is the solvent employed, the procedure using ethyl alcohol is not as satisfactory as that using methyl alcohol since the reaction cannot be controlled nearly as satisfactorily nor as consistently as when methyl alcohol is used. The partial saponification is a selective reaction, of course, and it is highly desirable to be able to control the reaction so that the 3-acetate-17-benzoate ester is substantially completely saponified to the desired 17-benzoate ester before the latter is appreciably further saponified to the 3,17-diol. When the reaction is carried out in ethyl alcohol, it is found that because of the faster rate of reaction it is a very, very difficult matter to determine the proper point at which to stop the reaction. If the reaction is stopped too soon, the 17-benzoate ester which is isolated from the reaction mixture will be admixed with a certain amount of unchanged 3-acetate-17-benzoate ester from which it is very difficult to separate the pure benzoate ester without appreciable losses. On the other hand, if the reaction is allowed to proceed for too long a time, the yield of desired monoester will be reduced through conversion of part of the monoester to the 3,17-diol. Consequently, when carrying out the reaction in ethyl alcohol where the rate of saponification is relatively rapid, it is exceedingly difficult to achieve complete saponification of the diester to the monoester without suffering losses by further saponification of the monoester to diol.

Another procedure which has been used for producing the monobenzoate is that used in Germany by Schering A. G. which procedure is disclosed in F. I. A. T. Final Report No. 996, entitled "The Commercial Development and Manufacture of Synthetic Hormones in Germany," written by Carl R. Addinall for the Field Information Agency, Technical United States Group Control Council for Germany. In the Schering process, the procedure of Ruzicka et al. is improved slightly since the total volume of solvent which must be employed is reduced to some extent; however, the Schering procedure is still subject to the disadvantage of requiring long reaction periods, e. g. 47 hours. In the Schering procedure a mixture of ethylene chloride and methyl alcohol in a ratio of approximately one volume of ethylene chloride to 12 volumes of methyl alcohol is employed as the saponification solvent. The ratio of solvent to diester is approximately 65 mls. of solvent per gram of diester. Although this is less than one-third the amount of solvent required in the procedure of Ruzicka et al., it is still a large amount of solvent to work with as compared to the small amount of diester being processed.

It is the object of this invention to provide an improved procedure for preparing the 17-monobenzoate ester of $\Delta^{5,6}$-androstene-3,17-diol.

A further object of the invention is to substantially reduce the time required to carry out the partial saponification of mixed diesters of $\Delta^{5,6}$-androstene-3,17-diol having a benzoate group at the 17 position without reducing the yield of the 17-monobenzoate ester which is obtainable.

An additional object of the invention is to substantially reduce the volume of solvent required to carry out the saponification of a given quantity of a mixed diester of Δ$^{5,6}$-androstene-3,17-diol having a benzoate group at the 17 position to the 17-monobenzoate ester thereof.

Another object of the invention is to provide a procedure for producing the 17-monobenzoate ester of Δ$^{5,6}$-androstene-3,17-diol wherein a simple means for determining the point at which the reaction is complete is available.

Other objects of the invention will in part be obvious and will in part appear hereinafter.

It has now been discovered that the above and other objects of the invention can be readily accomplished by carrying out partial saponification of a mixed diester of Δ$^{5,6}$-androstene-3,17-diol having a benzoate group at the 17 position in a solvent comprising a mixture of methyl alcohol and methylene chloride. By carrying out the partial saponification in such a solvent mixture, it is possible to reduce the amount of solvent required per gram of diester to a value as low as about 10 to 15 mls. of solvent per gram of diester. Furthermore, the time required for the partial saponification reaction is only about one-third to one-fourth of the time required for carrying out the partial saponification when methyl alcohol is utilized by itself as the saponification solvent. Thus in accordance with the process of our invention, the partial saponification of the diester may be carried out in from about 10 to 15 hours with a yield of 17-monobenzoate ester of about 90% to 95% or more being obtained. Moreover, it is very easy to qualitatively determine when substantially all of the diester has reacted by taking a small sample of the reaction mixture and heating it until the methylene chloride is driven off. Inasmuch as methylene chloride has a boiling point of about 41° C. and methyl alcohol has a boiling point of about 65° C., the methylene chloride is readily removed from the solvent mixture. If all of the diester has been saponified either partially or completely, removal of the methylene chloride from the reaction mixture will cause the 17-monobenzoate ester to precipitate therefrom in the form of well defined needles. However, if there is even as little as 2% or diester present in the reaction mixture, the material which separates from the methyl alcohol on removal of the methylene chloride from the solvent mixture will have somewhat of an amorphous form. Although it is not necessary when carrying out the partial saponification in accordance with the procedure of the present invention to test the reaction mixture to determine whether or not the diester has been completely eliminated, it is highly desirable to have such a test available just in case the temperature of the reaction mixture should be drastically altered either up or down for some unexpected reason. In such a case, it would be a relatively simple matter by means of the test outlined just above to determine whether or not the reaction had substantially been completed and, if desired, the subsequent progress of the reaction could easily be followed by carrying out additional tests on the reaction mixture as the reaction proceeded.

The process of our invention is highly suitable for the production of the 17-monobenzoate ester of Δ$^{5,6}$-androstene diol from the 3-acetate-17-benzoate ester of androstene diol or from other suitably substituted diesters in which the acyl group in the 3 position is an aliphatic group such as the propionate or the butyrate group. Since the acylating agents used in preparing the 3-acetate esters are at the present time more readily available and are less expensive than the acylating agents used to produce the 3-propionate and 3-butyrate esters, we prefer to employ the 3-acetate-17-benzoate ester to produce the 17-monobenzoate ester. However, either of the other two esters listed above can be employed to produce the 17-monobenzoate ester by the procedure of our invention.

In carrying out the process of the invention, a mixture of methylene chloride and methyl alcohol is employed as the reaction medium for the partial saponification. The ratio of the two solvents to one another may vary but in order to obtain satisfactory results the methylene chloride should make up at least about 30% of the solvent mixture and should not exceed more than about 70% of the solvent mixture with substantially all of the remainder of the mixture in each case being made up of methyl alcohol. The relative ratio of methylene chloride to methyl alcohol will vary to some extent upon the concentration of diester which is dissolved in the solvent mixture. As pointed out hereinabove, the diester is not appreciably soluble in methyl alcohol alone. In the prior art procedures, despite the very large volumes of solvent which are employed, the mixed diester does not go completely into solution until the reaction has proceeded for some time and a large part of the diester has been saponified, and then usually as soon as all of the diester is in solution the monobenzoate ester begins to crystallize out. In the present procedure, however, the diester and the monoester are both completely soluble in the solvent mixture which is used inasmuch as sufficient methylene chloride is present in all cases to cause both esters to be completely soluble in the solvent mixture. Therefore, the minimum quantity of methylene chloride which is employed is governed principally by the ratio of diester to the total solvent mixture which is used. Thus when a ratio of solvent mixture to diester which is relatively high, e. g. 50 ml. of solvent mixture to 1 gram of diester, is employed, the proportion of methylene chloride in the solvent mixture can be rather low, e. g. in such a case it need make up only about 30% of the solvent mixture, as compared to when the ratio of solvent mixture to diester is relatively low, e. g. when a ratio of 20 ml. of solvent mixture to 1 gram of diester is employed, in which case it is desirable that the methylene chloride make up at least about 50% of the solvent mixture. The partial saponification can be carried out by using as much as 70% of methylene chloride in the solvent mixture and heating the reaction mixture at the reflux temperature of the methylene chloride, and in such a case, the reaction can be completed in from 3 to 4 hours time; however, the results which are obtained by such a procedure are not as satisfactory as when operating at a lower temperature and with a higher ratio of methyl alcohol in the solvent mixture as in the preferred embodiment of our invention. Ordinarily from about 10 ml. to about 50 ml. of the solvent mixture per gram of diester is employed with from about 20 ml. to about 30 ml. of solvent mixture per gram of diester being the preferred ratio of solvent to diester.

In carrying out the partial saponification of the diester, the quantity of alkali, such as potassium or sodium hydroxide, which is employed is preferably approximately the amount theoretically required to carry out the partial saponification. Amounts smaller than this can be employed, however, since the partial saponification actually proceeds for the most part as a transesterification process, that is the major percentage of the acyl radicles which are split off from the 3 position of the diester react with the alcohol in the reaction mixture to form esters instead of forming salts by reacting with the cation from the alkali. This phenomena was pointed out by Ruzicka et al. on page 2 of U. S. Patent No. 2,387,469, column 1, lines 37 to 43. In Example V of their patent, they point out that only about 10% of the amount of alkali theoretically required is used up by the reaction. We have found that that is also the case in the work which we have carried out.

The temperature at which the partial saponification is carried out can vary although it is best to carry out the process at a temperature between about 20° C. and —10° C. and preferably at a temperature between about 10° C. and about 0° C. The rate of reaction will vary, of course, depending upon the temperature at which the process is conducted. As pointed out above, if the reaction is carried out at the reflux temperature of methylene chloride it can be completed in from 3 to 4 hours. However, such reaction conditions are rather drastic and it will be found that in such cases a very substantial amount of diester may be completely hydrolyzed to the diol before all of the diester is eliminated. This, of course, is not desirable. When the reaction is carried out at a temperature from about 3° C. to about 5° C., it will be completed in from about 10 to 15 hours. At that temperature if the reaction is discontinued prior to about 10 hours it will be found that a small amount of the diester will not have been saponified. If the reaction continues for much longer than 15 hours at that temperature it will be found that the yields obtained will be slightly less than the yields obtained when the reaction is allowed to proceed for a period from about 10 to 15 hours since part of the desired monoester will be converted to free diol. If desired, the reaction may be carried out at a temperature as low as —10° C. In that case it will be found that a period of about 60 hours will be required to eliminate all of the diester; the yields, however, will be just as good as those obtained when the reaction is carried out at a temperature of about 3° C. to about 5° C. for a period of from about 10 to 15 hours. When the reaction is carried out in accordance with the preferred temperature ranges, it will be found that the yields in general will be about 90% to 95% or greater of the desired 17-monobenzoate ester. As previously pointed out the ratio of methylene chloride to methyl alcohol in the solvent mixture may vary somewhat; however we have found that mixtures containing from about 45% to about 55% of methylene chloride by volume with substantially all of the remainder of the solvent being made up of methyl alcohol are the most satisfactory.

After the reaction has proceeded to the point where no more diester is present, the reaction is stopped by neutralizing the alkali in the reaction mixture with a suitable neutralizing agent such as acetic acid, hydrochloric acid or any other desired acidic material. Then the methylene chloride is distilled off from the reaction mixture. As soon as all of the methylene chloride has been removed it will be found that the 17-monobenzoate ester will separate from the methyl alcohol in the form of fine needles which are of a high state of purity. The crystals of the 17-mono-benzoate ester which are formed are filtered, centrifuged or otherwise suitably removed from the methyl alcohol and then the methyl alcohol is usually concentrated in order to crystallize any 17-monobenzoate ester which was not removed by the first crystallization. This procedure may be repeated again if desired although in most cases by far the greater part of the desired monobenzoate will be recovered in the first two crystallizations. The remaining methyl alcohol which has not been distilled off will contain a small amount of free diol which was formed by complete saponification of a small proportion of the diester. This diol may be readily recovered from the methyl alcohol by precipitation with water and then may be subjected to any desired treatment or discarded if desired.

For a fuller understanding of the nature and objects of the invention, reference may be had to the following examples which are given merely as further illustrations of the invention and are not to be construed in a limiting sense.

*Example I*

A solution of 2.18 gm. of $\Delta^{5,6}$-androstene-3-trans-17-trans-diol-3-acetate-17-benzoate in a solvent mixture made up of 25 ml. of methylene chloride and 25 ml. of methyl alcohol was cooled to 3°–5° C. Then 3.3 ml. of a 10% solution of potassium hydroxide in methyl alcohol (one mole proportion) were added, and the resulting solution was maintained at 3°–5° C. for 11½ hours. The reaction was then terminated by acidifying the reaction mixture with glacial acetic acid, and the reaction mixture was then worked up to recover the desired 17-monobenzoate ester. Instead of recovering the 17-monobenzoate ester by the procedure which we prefer to employ in plant practice, i. e. by merely distilling off the methylene chloride whereupon the 17-monobenzoate ester crystallizes from the remaining methanol, we employed a slightly different procedure to recover the 17-monobenzoate ester. The reason we did this was because the present experiment was one of a series in which we made a detailed study of the percentage yields obtainable under varying reaction conditions, and therefore we recovered the 17-monobenzoate ester from the reaction mixture by a procedure which although slightly more involved than our preferred plant procedure permitted a more detailed examination of the products obtained from each experiment. This recovery procedure involved admixing the entire acidified reaction mixture with about two volumes of water, separating the methylene chloride layer, and extracting the aqueous layer with methylene chloride. The combined methylene chloride extracts were evaporated to dryness under reduced pressure and the residue then fractionally recrystallized from methyl alcohol so as to obtain three crops of crystalline 17-monobenzoate ester which were examined for purity. The first crop of 17-monobenzoate ester separated from the mixture in the form of fine needles which had a melting point of 220–222° C. The second and third crops obtained by successively concentrating and cooling the filtrate from the previous crop also separated as fine needles and melted at 218.5–220° C. and 215.5–217.3° C. respectively. The first crop gave 1.30 gm. of the 17-monobenzoate ester, the second crop gave 0.50 gm., and the third crop gave 0.05 gm. for a total yield of 1.85 gm. of the desired 17-monobenzoate ester of androstene diol. This was 94% of the yield theoretically obtainable. We have obtained essentially the same excellent results when the 17-monobenzoate ester is recovered by merely distilling the methylene chloride from the reaction mixture and then separating the methyl alcohol from the crystals of 17-monobenzoate ester—which form as soon as the methylene chloride is removed—by filtration or other suitable means.

Example II

Several other experiments were carried out in exactly the same manner as the experiment of Example I except for the length of time the reaction was allowed to proceed and the use of a different sample of the 3-acetate-17-benzoate than that employed in Example I. When the reaction times were 11, 12, 13 and 15 hours, the yields obtained were 89.2% 89%, 89.2% and 89% of the theoretical yield of the desired 17-monobenzoate ester of androstene diol. In each case the products had the same excellent purity as the product of Example I. When the reaction time was only 7 hours, a total yield of material of 92.5% was obtained; however, the product contained a small amount of the 3-acetate-17-benzoate ester as was evidenced by the fact that the first crop of crystals, although it had a melting point of 218–221° C., did not have the proper crystalline form but was a mixture of crystalline needles and plates. The second and third crops of crystals had melting points of 215–218° C. and 210–212° C. respectively, and the crystals in the third crop had an amorphous form. The low melting points of the crystals from the second and third crops and the amorphous structure of the third crop of crystals indicated that a small part of the 3-acetate-17-benzoate ester had not been saponified. When the reaction time was 9 hours, the first and second crop of crystals were very satisfactory but the small amount of crystals obtained in the third crystallization (0.07 gm.) had a low melting point and were of an amorphous structure. The yield was 92% of the theoretical yield. It is apparent therefore that under the reaction conditions employed, it is necessary to allow the reaction to proceed over a period of at least 9 hours and preferably for at least about 10 hours. In another experiment a reaction time of 21 hours was employed and a very excellent product was obtained, but the total yield dropped to 83% of the theoretical yield due to conversion of part of the monoester of the free diol. These experiments show quite clearly that there is quite a bit of leeway in the reaction time which can be utilized and still obtain excellent yields of a very pure product. Thus even when the reaction time varied from 11 to 15 hours, approximately 90% yields of a very high quality product were obtained in every case.

Example III

Additional partial saponification of 3-acetate-17-benzoate androstene diol were carried out using the same procedure and same quantities of materials as in Example I except that the solvent mixture in each case was made up of 25 ml. of methylene chloride and 50 ml. of methyl alcohol instead of 25 ml. of methylene chloride and 25 ml. of methyl alcohol as in Example I. Since a 50% larger volume of solvent was employed than in Example I but the amount of alkali employed was the same, the concentration of alkali per ml. of solvent was only two-thirds of that in Example I. This appeared to affect the rate of reaction since it was found that it was necessary to use a reaction time of about 15 hours in order to get substantially complete conversion of the mixed ester to a mixture of the 17-monobenzoate ester and free diol. When that reaction time was employed, the first two crystallizations gave an 85% yield of high quality 17-monobenzoate ester but the third crystallization gave a 4% yield of crystals having an amorphous structure and a slightly low melting point.

Example IV

A series of partial saponifications was carried out as in Examples I and II except that the reactions were carried out at −10° C. instead of at 5° C. as in Examples I and II. It was found that lowering the temperature of the reaction mixture considerably increased the time required for the partial saponification. Thus when a reaction time of 47 hours was employed, the product obtained still contained some unsaponified 3-acetate-17-benzoate ester since the crystals recovered from all three of the crystallization steps had melting points a few degrees below that of the pure 17-monobenzoate ester. Also the third crop of crystals had an amorphous structure. However, when a reaction time of 63 hours was employed an 89% of a high quality product was obtained. Thus it appears that when a reaction temperature of −10° C. is employed, a reaction time is required which is about five to six times as long as is needed when the reaction is conducted at 5° C.

Example V

Partial saponifications of 3-acetate-17-benzoate androstene diol were carried out using reaction mixtures made up of 2.18 gm. of the diester, 10 ml. of methyl alcohol, 25 ml. of methylene chloride and 3.3 ml. of a 10% solution of potassium hydroxide in methyl alcohol (one mole proportion). Instead of carrying out the reactions at relatively low temperatures as in the previous experiments, the mixtures were heated at the reflux temperature of the methylene chloride. Also instead of neutralizing the alkali with acetic acid as in the previous experiments, hydrochloric acid was employed. Otherwise the experiments were carried out in essentially the same manner as those of the previous examples. It was found that a reaction time of 3½ hours was insufficient to convert all of the mixed diester to the 17-monobenzoate ester or a mixture of the 17-monobenzoate ester and the free diol. However, when a reaction time of only an additional half-hour was employed, i. e. a reaction time of 4 hours, the saponification went too far. Although excellent quality 17-monobenzoate ester was obtained in the latter case, the yield was only 46.5% since a substantial part of the ester had been completely saponified to the free diol. It is apparent therefore that when the reaction is carried out at relatively high temperatures an appreciable conversion of the monoester to free diol may occur by the time all of the diester has been converted to either monoester or a mixture of monoester and free diol. Also it would appear that there is little leeway with regard to the length of the reaction time as compared to when the reaction is carried out at a low temperature and that if the reaction is not stopped at exactly the right time either the product obtained will not be pure or the yield will be considerably reduced depending on whether slightly too short or slightly too long a reaction time is employed.

The process of our invention tremendously increases the output of any given amount of plant equipment as compared to when the procedures of the prior art are employed. Thus when operating in accordance with the preferred procedure of our invention the reaction time required is only about one-fifth of that required for the prior art procedures. Furthermore, the volume of the reaction mixture for any given amount of diester which is being partially saponified need be no more than about one-third of the volume required in one of the prior art procedures and only about one-eighth of the total volume of reaction mixture required in another prior art procedure. It is apparent, therefore, that our procedure is from 15 to 40 times more efficient than these prior art procedures as far as the utilization of any given amount of plant equipment is concerned.

Having described our invention, what we claim as new and desire to secure by Letters Patent is:

1. A process for the production of the 17-monobenzoate ester of $\Delta^{5,6}$-androstene-3,17-diol which comprises partially saponifying in a solvent mixture comprising methylene chloride and methyl alcohol a diester of the androstene diol esterified on the 3 position with an acyl radicle selected from the group consisting of $CH_3CO-$, $C_2H_5CO-$ and $C_3H_7CO-$ and esterified on the 17 position with a benzoyl group.

2. A process for the production of the 17-monobenzoate ester of $\Delta^{5,6}$-androstene-3,17-diol which comprises partially saponifying in a solvent mixture comprising methylene chloride and methyl alcohol a diester of the androstene diol esterified on the 3 position with an acyl radicle selected from the group consisting of $CH_3CO-$, $C_2H_5CO-$ and $C_3H_7CO-$ and esterified on the 17 position with a benzoyl group, the partial saponification being carried out at a temperature between about 20° C. and about −10° C.

3. The process of claim 1 wherein from about 10 ml. to about 50 ml. of the methylene chloride-methyl alcohol solvent mixture is employed for each gram of diester.

4. The process of claim 2 wherein from about 10 ml. to about 50 ml. of the methylene chloride-methyl alcohol solvent mixture is employed for each gram of diester.

5. A process for the production of the 17-monobenzoate ester of $\Delta^{5,6}$-androstene-3,17-diol which comprises partially saponifying a diester of the androstene diol esterified on the 3 position with an acyl radicle selected from the group consisting of $CH_3CO-$, $C_2H_5CO-$ and $C_3H_7CO-$ and esterified on the 17 position with a benzoyl group, the partial saponification being carried out in a solvent mixture comprising from about 30% to about 70% of methylene chloride with the rest of the solvent mixture being made up substantially of methyl alcohol employing from about 10 ml. to about 50 ml. of the solvent mixture for each gram of diester.

6. The process of claim 5 wherein the partial saponification is carried out at a temperature between about 20° C. and about −10° C.

7. The process of claim 5 wherein the partial saponification is carried out at a temperature between about 10° C. and about 0° C.

8. A process for the production of the 17-monobenzoate ester of $\Delta^{5,6}$-androstene-3,17-diol which comprises partially saponifying a diester of the androstene diol esterified on the 3 position with an acyl radicle selected from the group consisting of $CH_3CO-$, $C_2H_5CO-$ and $C_3H_7CO-$ and esterified on the 17 position with a benzoyl group, the partial saponification being carried out in a solvent mixture comprising from about 30% to about 70% of methyl chloride with the rest of the solvent mixture being made up substantially of methyl alcohol, employing from about 10 ml. to about 50 ml. of the solvent mixture for each gram of diester, carrying out the partial saponification at a temperature between about 10° C. and about 0° C. for a period of from about 10 to about 15 hours, then neutralizing the alkali employed as the saponifying agent, distilling the methylene chloride from the reaction mixture and recovering the 17-monobenzoate ester of the androstene diol from the methyl alcohol by crystallization.

9. A process for the production of the 17-monobenzoate ester of $\Delta^{5,6}$-androstene-3,17-diol which comprises carrying out the partial saponification of the 3-acetate-17-benzoate diester of $\Delta^{5,6}$-androstene-3,17-diol in a solvent mixture comprising from about 30% to about 70% of methylene chloride with the rest of the solvent mixture being made up substantially of methyl alcohol employing from about 10 ml. to about 50 ml. of the solvent mixture for each gram of the diester.

10. The process of claim 9 wherein the partial saponification is carried out at a temperature between about 20° C. and about −10° C.

11. The process of claim 9 wherein the partial saponification is carried out at a temperature between about 10° C. and about 0° C.

12. A process for the production of the 17-monobenzoate ester of $\Delta^{5,6}$-androstene-3,17-diol which comprises carrying out the partial saponification of the 3-acetate-17-benzoate diester of $\Delta^{5,6}$-androstene-3,17-diol in a solvent mixture comprising from about 30% to about 70% of methylene chloride with the rest of the solvent mixture being made up substantially of methyl alcohol employing from about 10 ml. to about 50 ml. of the solvent mixture for each gram of the diester, carrying out the partial saponification at a temperature between about 10° C. and about 0° C. for a period of from about 10 to about 15 hours, then neutralizing the alkali employed as the saponifying agent, distilling the methylene chloride from the reaction mixture and recovering the 17-monobenzoate ester of the androstene diol from the methyl alcohol by crystallization.

13. A process for the production of the 17-monobenzoate ester of $\Delta^{5,6}$-androstene-3,17-diol which comprises carrying out the partial saponification of the 3-acetate-17-benzoate diester of $\Delta^{5,6}$-androstene-3,17-diol in a solvent mixture comprising from about 45% to about 55% of methylene chloride with the rest of the solvent mixture being made up substantially of methyl alcohol employing from about 20 ml. to about 30 ml. of the solvent mixture for each gram of diester and carrying out the partial saponification at a temperature of from about 10° C. to about 0° C.

14. The process of claim 13 wherein the partial saponification reaction is allowed to proceed for from about 10 to about 15 hours, the alkali employed as the saponifying agent then neutralized, the methylene chloride distilled off from the reaction mixture, and the 17-monobenzoate ester of the androstene diol then recovered from the methyl alcohol by crystallization.

JOSEPH LEVY.
ROLAND KAPP.

No references cited.

Certificate of Correction

Patent No. 2,521,586 September 5, 1950

JOSEPH LEVY ET AL.

It is hereby certified that error appears in the printed specification of the above numbered patent requiring correction as follows:

Column 10, line 3, for "methyl" read *methylene*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*